Figure 1:
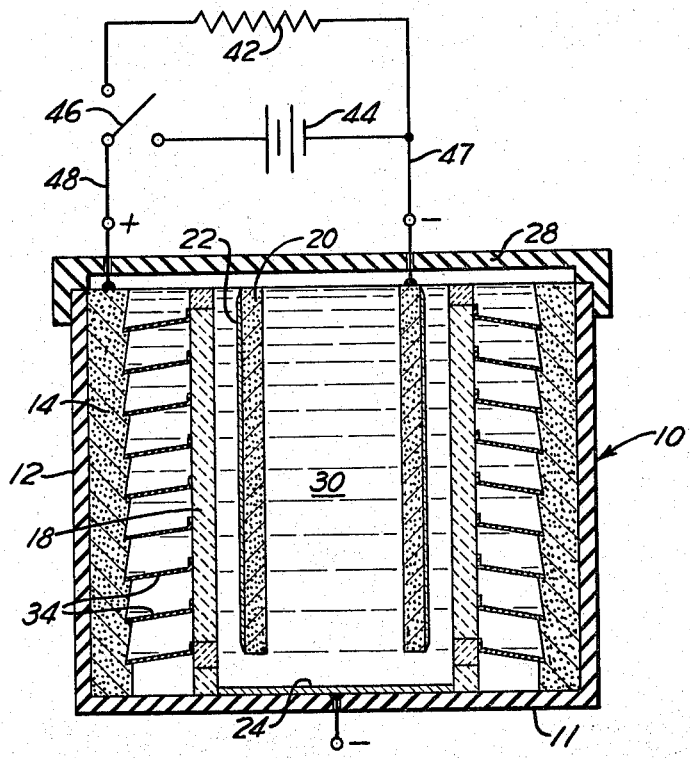

Nov. 15, 1966  R. ZITO, JR  3,285,781
STORAGE BATTERY HAVING BROMINE POSITIVE ACTIVE MATERIAL
Filed Oct. 21, 1963

INVENTOR.
RALPH ZITO, JR.
BY
Frederick Shape
ATTORNEY.

United States Patent Office 3,285,781
Patented Nov. 15, 1966

3,285,781
STORAGE BATTERY HAVING BROMINE POSITIVE ACTIVE MATERIAL
Ralph Zito, Jr., Newtown Square, Pa., assignor to Westinghouse Electric Corporation, East Pittsburgh, Pa., a corporation of Pennsylvania
Filed Oct. 21, 1963, Ser. No. 317,507
4 Claims. (Cl. 136—14)

This invention relates to improved cells and batteries thereof and in particular concerns high energy storage batteries.

It is an object of the present invention to provide an improved secondary or storage cell that is characterized by a comparatively high energy storage capacity, that is easily made from readily available materials, that is capable of indefinite number of charging and discharging cycles, that has long shelf life and is otherwise particularly suited to the storage of electrical energy.

On a theoretical basis, a zinc-bromine secondary cell is known. It is further known that such cells should be capable of providing high energy storage capacity. The reactions that take place in a zinc-bromine cell can be indicated as follows:

Negative Electrode: $Zn \rightarrow Zn^{++} + 2e$
Positive electrode: $Br_2 + 2e \rightarrow 2Br^-$ and the overall reaction is:

$$Zn + Br_2 \rightleftharpoons ZnBr_2$$

The electrons associated with each zinc atom flow through an external electrical circuit to the positive electrode where they are discharged in producing bromine ions.

During the charging cycle for such a cell, bromine is liberated at the positive electrode and zinc is plated on the negative electrode, thereby consuming an initial quantity of zinc bromide salt in the cell. When most, i.e. about 80 weight percent, of the zinc bromide salt is decomposed in that fashion, the cell is considered to be fully charged and ready for electrical discharge through an appropriate circuit.

By providing an intervening electrical process to take place at the respective electrodes, free energy of the reaction of zinc and bromine to form zinc bromide is available as electrical current. It can be shown that this free energy can provide a theoretical electrical output of about 196 watt hours per pound of reactants alone, and gives an open circuit voltage of about 1.82 volts at 25° C. However, since a cell cannot be composed solely of the active components, it is evident that the electrical output in watt hours per pound of cell cannot be that determined solely from the free energy. For example, a conventional lead storage battery can provide only about 20 percent of the electrical output that theory indicates should be available. In the present invention there is disclosed a structure by which a good percentage of the theoretical storage capacity for a zinc-bromide storage cell can be realized.

One of the problems in constructing a cell with zinc and bromine is proper distribution of the bromine relative to the positive electrode so that appropriate reaction can take place at the positive electrode during use. In the charged state, bromine in the cell is liquid at normal conditions and therefore will tend to concentrate at the lowest level that it can achieve. Moreover, the specific gravity of bromine (3.0) is higher than the solution average of bromine in aqueous zinc bromide. This can limit reaction of bromine and its associated electrode and thereby limit the output that can be achieved.

This problem is overcome and an improved secondary or storage cell is provided in accordance with the present invention by a structure that includes specific separated compartments for each of the components of the cell and a special plurality of compartments spaced relative to the positive electrode whereby the bromine is distributed along that electrode for reaction. This structure insures intimate contact of the bromine and the positive electrode by taking advantage of the fact that liquid seeks its own level and by distributing the bromine into compartments or zones along the surface of the anode.

Thus the structure of the invention comprises in one embodiment, spaced electrodes that are separated by a porous member, and a plurality of members extending between the porous member and the positive electrode to divide that space into a plurality of compartments such that bromine will be distributed along the positive electrode and thereby be maintained available for the necessary reaction.

Figure 2:
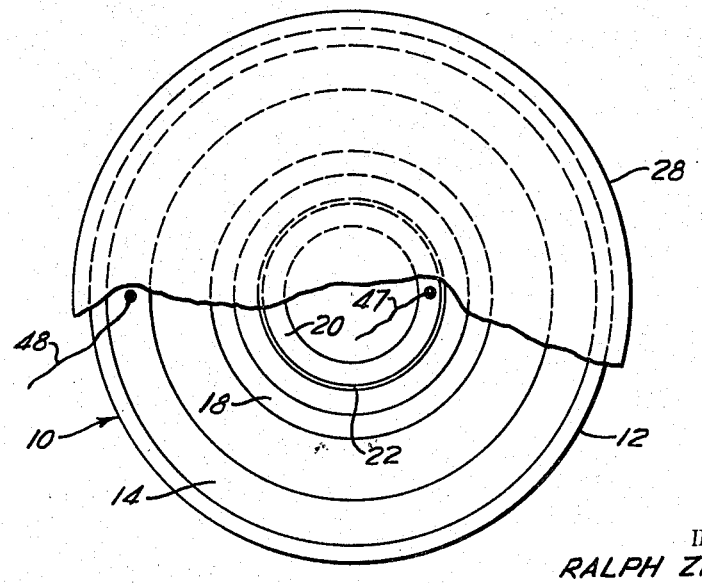

The invention will be most readily understood upon considering the attached drawing in conjunction with the following detailed description and discussion. In the drawings:

FIG. 1 is a vertical section through a generally cylindrical shaped cell of the present invention showing, schematically, an external circuit associated therewith; and FIG. 2 is a top plan view of the cell of FIG. 1.

Referring now to the drawing, the numeral 10 indicates generally a casing member that, in the embodiment shown, is of a cylindrical configuration having a closed end 11. The casing member 10 and its end wall 11 are composed of any suitable non-conducting material such, for example, as hard rubber or a synthetic material such as polyethylene, nylon, an acrylic resin, polyvinyl chloride, or the like, with any particular material being chosen with a view to strength, environment to be encountered and like considerations. Along the inside surface of the sidewall 12 of the casing member 10 is a cylindrical positive electrode 14 that may be formed of graphite or other suitable conducting material that is compatible with the active cell components. Spaced from positive electrode 14 and concentric therewith is a non-conducting porous cylinder 18 suitably composed of ceramic material, or a composite of non-conducting glass screen and porous polyvinyl chloride or similar resinous material. Within the porous cylinder 18 and concentric with it is a cylindrical negative electrode 20. The negative electrode is formed from a cylinder of graphite or other suitable conducting material, and has a deposit 22 of zinc on its external surface. The zinc deposit can, for example, be provided by electrodeposition initially, and is redeposited, at least to a substantial extent, during each charging cycle applied to the cell. While not essential to operation, a scavenger negative electrode 24 can be provided along the inside surface of bottom member 11. The scavenger electrode advantageously extends over the entire bottom 11 within the non-conducting cylinder 18. This electrode can be formed in the same manner as the cylindrical cathode 20 with its associated zinc coating, or the zinc portion alone may be used.

The cell shown is closed with a top or closure member 28 that sealingly engages the upper end of the side wall 12 of the casing 10. This member can be made of the same non-conducting material as casing 10 or of any other suitable non-conducting material. For ease of internal circulation of the electrolyte 30 within the zone bounded by the inner surface of the porous, non-conducting cylinder 18, it is desirable to space the lower end of the cylindrical negative electrode 20 from the bottom wall 11 of the casing 10. While not shown in detail in the drawing, the cylindrical cathode structure 20 is attached to and supported by the closure member 28 for the foregoing purpose. Of course other means of support, or other structure can be used to accomplish that result. For connection to an external circuit, the closure member also is provided with means by which connection can be made to the electrodes. Still further, since gas may be developed in cell operation, the closure member can be hollowed out to provide adequate gas space, and vent holes can be provided therein if desired.

In the annular space defined between the outer surface of the porous cylinder 18 and the inner surface of the anode cylinder 14 are a plurality of annular non-conducting members 34. These members 34 extend horizontally between those surfaces and are vertically spaced. Consequently, they thereby define a plurality of annular compartments for the cell constituent that is active at the positive electrode, i.e. the bromine. The annular members 34 can be angled downwardly slightly from the horizontal toward cylinder 14 so that liquid will tend to be kept in contact with the anode. These shelf members 34 can be composed of any desired non-conducting material such, for example, as any of those indicated hereinbefore with respect to the casing member 10. The shelf members 34 can be attached to cylindrical members 14 and 18 by being received in grooves (not shown) in the surfaces of those cylinders. Or they could be glued to the cylinders with any adhesive that would withstand the bromine. A typical glue for this purpose is a tacky mixture of nitrocellulose, isopropanol, toluol and methyl-ethyl-ketone.

The schematic external circuit shown in FIG. 1 is composed of a resistance or load 42, a battery 44 for charging purposes, a switch 46 arranged to connect either the load or the battery across the cell electrodes and suitable leads 47 and 48 to the negative and positive electrodes.

In operation, the cell is filled with aqueous 6.6 molar zinc bromide, though of course an electrolyte of higher or lower molarity could as well be used. Then the battery switch is closed to provide, for example, a constant 2 ampere rate until about 80 percent of the zinc bromide is decomposed, whereby bromine produced diffuses into the compartments at shelfs 34, and zinc is electrodeposited on the negative electrode 20. Generally a charging density of about 0.25 to 0.75 amp per square inch is employed, but higher or lower densities can be used if desired. Thereupon the cell can be used as desired, i.e. be discharged over any suitable load.

In view of the structure provided, the bromine is maintained available to the positive electrode as long as unreacted bromine exists, that is as long as the cell is not fully discharged. In the charged state the porous separator aids in keeping the cell from decaying by acting as a physical barrier to the migration of molecular bromine to the zinc for premature chemical reaction. In the discharged state, the active components are bound in the form of zinc bromide. Tests of zinc bromide cells have shown operability over a range of about 0 to 50° C. with adequate efficiency.

It will be appreciated that changes can be made from the foregoing detailed description without departing from the scope of the invention. For example, the cell can be constructed with a rectangular or square cross-section. The ends of the electrodes in any configuration can be field shielded from one another by projection of an insulated member therebetween to minimize any zinc filament growth or treeing around the electrode edges. A plurality of cells can be assembled to a battery, using a common casing, charging circuit, closure member and the like. Activated carbon or other adsorbent can be included in the described compartments to aid in bromine retention at the positive electrode when the cell is in the charged state. For example, the activated carbon, which is itself an electrical conductor, can fill the compartments and contact the positive electrode. Bromine is adsorbed on the surfaces of carbon particles and thereby is kept in intimate contact with the positive electrode. It has been found that bromine is adsorbed to the order of about one gram or so per gram of the activated carbon. Other modifications will occur to those skilled in the art, and it should be understood that the invention is not to be limited to the details provided for purposes of illustration.

I claim:

1. A sealed storage battery cell structure comprising elemental bromine as the positive active material, zinc as the negative active material and a zinc bromide electrolyte, the cell comprising two electrically conducting vertically extending, horizontally spaced electrodes, one of the electrodes being a positive electrode and the other a negative electrode having the zinc thereon, a non-conducting porous member vertically extending between and horizontally spaced from the spaced electrodes, and a plurality of vertically spaced, horizontally extending shelf members adapted to retain elemental bromine thereon extending between and in contact with the positive electrode and the said non-conducting porous member.

2. A cell structure in accordance with claim 1, in which the shelf members incline downwardly from the horizontal toward the positive electrode.

3. A cell structure in accordance with claim 1, said electrodes being composed of graphite.

4. A sealed storage battery in accordance with claim 1 wherein the electrodes, porous member and shelf members, are cylindrical.

References Cited by the Examiner

UNITED STATES PATENTS

| | | | |
|---|---|---|---|
| 2,228,264 | 1/1941 | Freedley | 204—260 X |
| 3,088,990 | 5/1963 | Rightmire et al. | 136—86 |
| 3,124,487 | 3/1964 | Duddy et al. | 136—86 X |
| 3,134,698 | 5/1964 | Neipert et al. | 136—83 X |
| 3,206,333 | 9/1965 | Ehrenfeld | 136—86 |

WINSTON A. DOUGLAS, *Primary Examiner.*

B. J. OHLENDORF, *Assistant Examiner.*